Feb. 24, 1970  H. THOSTRUP  3,497,670
APPARATUS FOR GAS-SHIELDED METAL-ARC WELDING
Filed Sept. 18, 1967  3 Sheets-Sheet 3
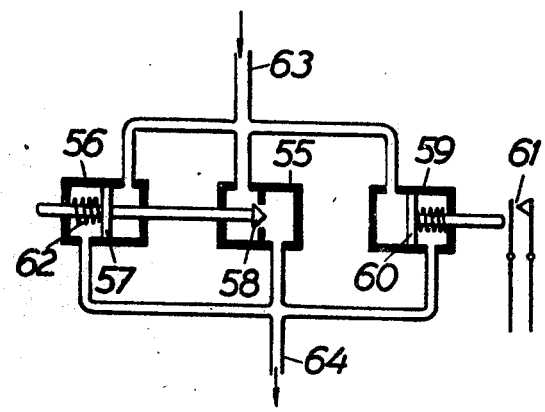

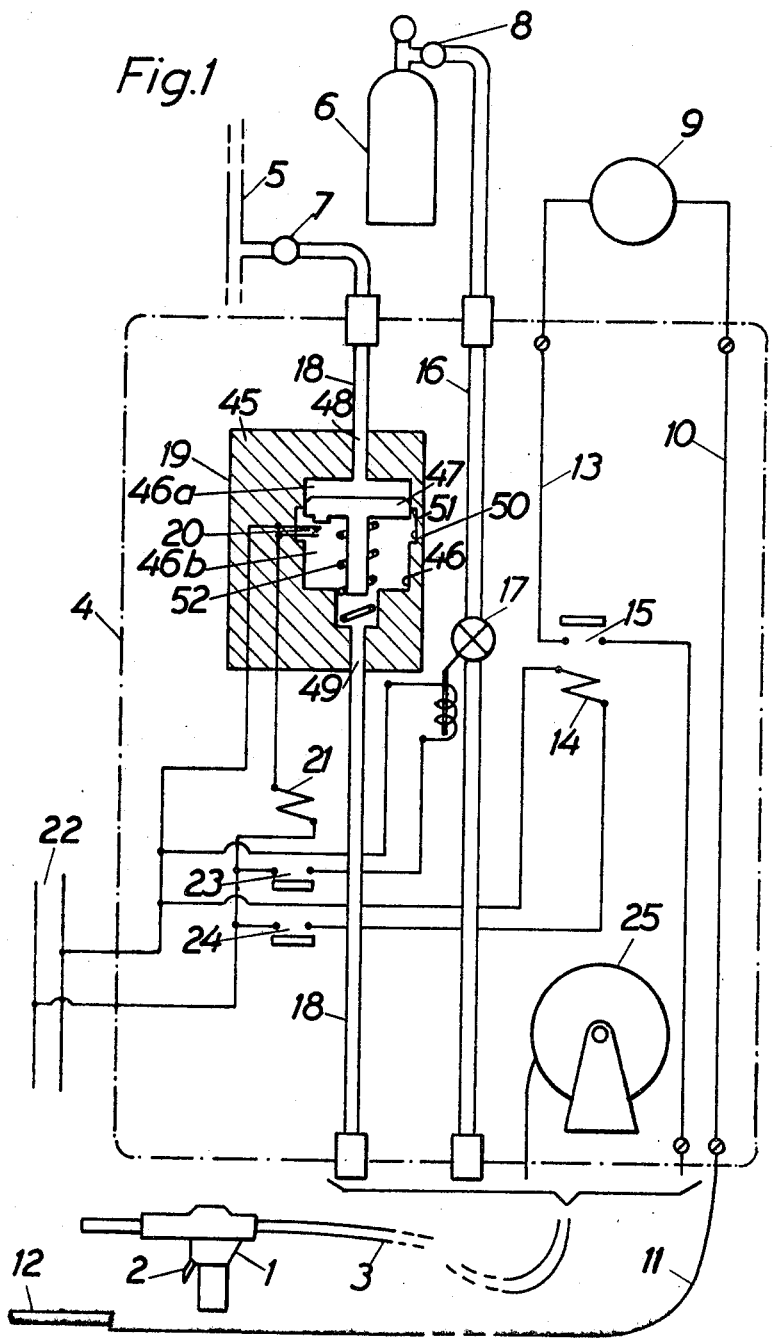

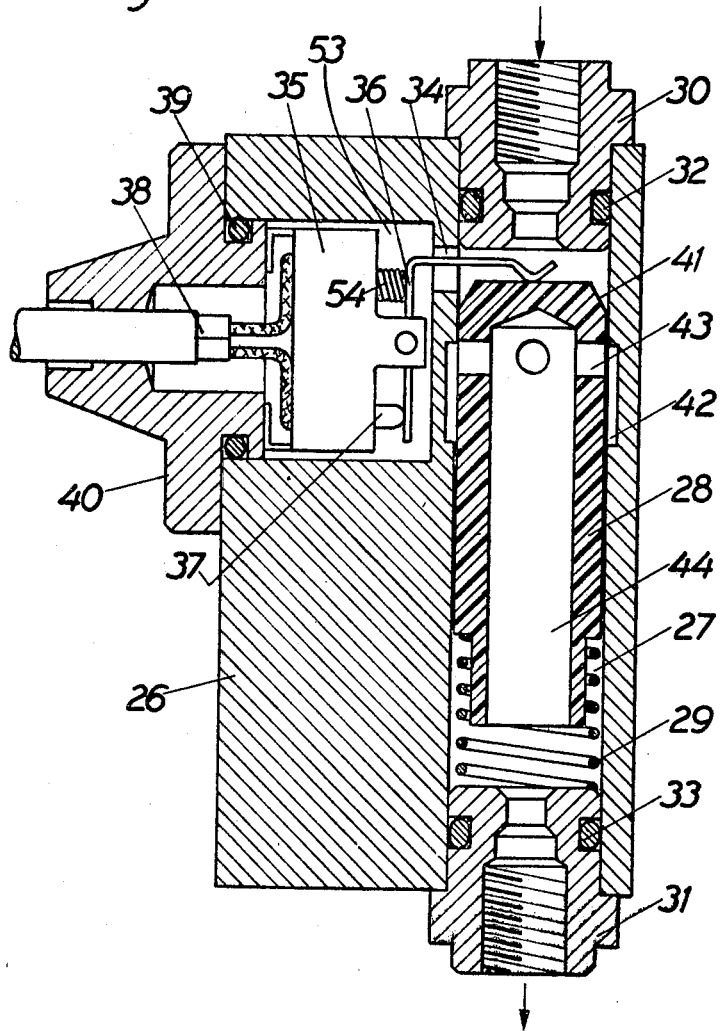

United States Patent Office 3,497,670
Patented Feb. 24, 1970

3,497,670
APPARATUS FOR GAS-SHIELDED METAL-ARC WELDING
Harry Thostrup, Laxa, Sweden, assignor to Elektriska Svetsningsaktiebolaget, Goteborg, Sweden, a corporation of Sweden
Filed Sept. 18, 1967, Ser. No. 668,470
Claims priority, application Sweden, Sept. 28, 1966, 13,026/66
Int. Cl. B23k 9/00, 9/16
U.S. Cl. 219—130
6 Claims

ABSTRACT OF THE DISCLOSURE

Apparatus for gas-shielded metal arc welding of the type comprising a welding gun provided with a pressure fluid operated wire advancing motor and a manually operated pressure fluid valve and connected to a control unit by flexible conduits. The supply of shielding gas to the gun is controlled by a valve in the control unit, said valve being operated by a pressure sensitive device subjected to the pressure differential caused by the flow of pressure fluid through a passage provided with a movable flow obstructing member automatically moved towards a position of less resistance in response to said pressure differential.

---

The present invention relates to apparatus for gas-shielded metal-arc welding of the kind comprising a welding gun provided with a pressure fluid driven wire advancing motor (usually a compressed-air motor) and with a manually actuated pressure fluid valve, a flexible welding cable, a control unit and flexible conduits for the supply of shielding gas and pressure fluid connecting the gun to said control unit, the control unit comprising a shielding gas valve connected between the flexible shielding gas conduit and a supply of shielding gas, and a pressure fluid path connected between the flexible pressure fluid conduit and a supply of pressure fluid, said pressure fluid path comprising a restriction, pressure sensitive means connected to said path so as to be operated by a pressure gradient caused by a flow of pressure fluid through said restriction, and means operated by said pressure sensitive means for opening said shielding gas valve. Apparatus of this type are disclosed in my U.S. patent specification No. 3,319,042.

For the proper functioning of apparatus of this type it is important to have the gas shield around the electrode tip fully established before the starting of the arc. The shielding gas valve therefore has to be opened by the pressure sensitive means before the full flow of the pressure fluid has set in, preferably before the pressure-fluid driven wire advancing motor has started. Said mode of functioning can be obtained by the use of a highly sensitive pressure sensitive means and/or by the use of a narrow restriction which makes a small flow produce a substantial pressure differential. Both of these expedients have disadvantages: Sensitive pressure sensing means are expensive and delicate, and a narrow restriction produces an undesirably large pressure drop at the fluid flows required for normal operation of the motor.

According to the invention, said disadvantages are avoided by the provision of means for automatically varying the area of the restriction in response to the fluid flow therethrough, more particularly in such a way as to increase the area of the restriction (and, consequently, reduce the flow resistance of the restriction) on increase of the fluid flow therethrough.

Other objects, advantages and features of the invention will be apparent from the following description, the accompanying drawing and the appended claims.

In the drawing,
FIG. 1 is a diagrammatic plan of a complete welding unit exemplifying the invention.
FIG. 2 is a sectional view of a fluid flow operated relay device embodying one form of the invention, and FIG. 3 is a schematic sectional view of another embodiment of a fluid flow operated relay device according to the invention.

The welding gun 1 of FIG. 1 is provided with a compressed-air driven wire advancing motor and with a valve for controlling the supply of compressed air to said motor, a trigger 2 being provided for actuating said valve. The welding gun is connected to a flexible welding wire guide, a flexible welding current cable and flexible conduits for compressed air and shielding gas, all of which flexible members are enclosed within a common hose member 3 and connected to a control unit 4. The control unit is connected to a compressed-air distribution system 5 and a shielding gas container 6 through reduction valves 7, 8, respectively. Moreover, the control unit is connected to a source of welding current 9, one terminal of which is connected through a conductor 10 provided in the control unit to the return cable 11 from the workpiece 12, while the other terminal is connected to the welding current cable through a connection 13 containing the contacts 15 of a contactor 14. A shielding gas conduit 16 provided in the control unit for connecting the flexible shielding gas conduit to the container 6 contains a selenoid valve 17. The conduit or path 18 provided in the control unit for connecting the flexible compressed-air conduit to the compressed-air distribution system contains a fluid flow sensing device 19 operating a switch 20 connected in series with the winding of a relay 21 to auxiliary voltage busbars 22. Said busbars also feed two more control circuits, to wit, one circuit containing the operating coil of the solenoid valve 17 in series with the normally open contacts 23 of the relay 21, and a second circuit containing the winding of the contactor 14 in series with the normally open contacts 24 of the relay 21. A welding wire drum 25 is rotatably supported in a standard disposed on or near the control unit.

The fluid flow sensing device 19 schematically shown in FIG. 1 comprises a body or housing 45 provided with a bore 46 divided by the movable flow obstructing member 47 into two chambers 46a, 46b connected to the conduit 18 through apertures 48, 49, respectively. The bore 46 has a recessed portion 50 offset by a shoulder 51 from the part of the bore which surrounds the chamber 46a. The flow obstructing member 47 is guided by means not shown for axial movement in the bore and is actuated by a compression spring 52 urging the obstructing member towards the position shown in which the obstruction member engages the narrow part of the bore 46 extending above the shoulder 51.

To start the welding operation, the welder pulls the trigger 2. This allows some air to escape from the chamber 46b through the aperture 49, resulting in a downwards movement of the obstructing member 47. This movement causes the obstructing member to operate the switch 20. The relay 21 is energized and closes its contacts 23 and 24. The windings of the solenoid valve 17 and the welding current contactor are energized. Solenoid valve 17 opens and admits shielding gas to the welding gun; the contactor closes its contacts 15, so that the welding voltage is admitted to the gun.

The continued movement downwards of the obstructing member 47 carries said member out of engagement with the narrow part of the bore 46, so that air can flow from the chamber 46a into the chamber 46b through an annular slit formed between the obstructing member 47 and the shoulder 51. The obstructing member stops in a position of equilibrium in which the downwards force exerted upon said member by the pressure differential acting upon it is equal to the upwards force exerted by the spring 52. The flow of air admitted by the obstructing member in this position causes the welding gun motor to operate at normal speed.

The preferred practical form of the fluid flow sensing device shown in FIG. 2 comprises a body block 26 provided with a cylindrical bore or valve chamber 27 and a pair of threaded fittings 30, 31 with sealing rings 32, 33, by means of which fittings the bore or chamber 27 is connected in the conduit 18 of FIG. 1. A plunger 28 actuated by a compression spring 29 is axially displaceable in the bore 27. The plunger may for instance consist of a polyamide plastic, while the spring may for instance consist of corrosion resistant steel. The plunger is provided with an axial bore 44 extending from the lower (downstream) end of the plunger to a point near the upper (upstream) end of the plunger and communicating through radial ports 43 with an annular groove 42 in the wall of the bore 27 of the body block. A recess 53 provided in the body block 26 laterally of the bore 27 and connected with said bore through a passage 34 is sealed off from the atmosphere by a closure member 40 provided with a sealing ring 39. A switch 35 corresponding to the switch 20 of FIG. 1 is mounted on the inner surface of said closure member and connected to a control cable 38 tightly fitted in said closure member. A switch actuating member 36 cooperating with the operating pin 37 of the switch extends through the passage 34 into the bore 27.

When there is no flow of fluid through the device, the plunger 28 is maintained by the spring 29 in the position shown in the figure, in which the upper (upstream) extremity of the plunger engages the wall of the bore 27 upstream of the annular groove 42 and the upper face of the plunger engages the switch actuating member 36. The decrease of the pressure acting on the underside (downstream side) of the plunger caused by the opening of the air valve of the welding gun results in a pressure differential forcing the plunger downwards, so that the upper face of the plunger is moved out of engagement with the switch actuating member, thus permitting said member to actuate the switch pin 37 under the action of the spring 54. The continued movement of the plunger carries the upper part of the plunger out of engagement with the part of the bore extending upstream of the groove 42, resulting in the formation of an annular slot between the upper edge of the groove 42 and the bevelled edge 41 of the plunger. There is thus established a path for the air entering the device through the upper fitting 30 through said annular slot, the annular groove 42, the ports 43 and the plunger bore 44 to the lower fitting 31. The plunger will come to rest in a position of equilibrium in which the upwards force of the compression spring equals the downwards force on the plunger caused by the pressure differential acting on the plunger.

In the embodiment above described, the plunger 28 has a triple function. First, it constitutes a fluid-pressure operated means for operating the switch 35. Secondly, it forms a movable constriction member for creating a variable fluid flow resistance. Thirdly, it also constitutes a fluid-pressure operated means for the automatic adjustment of the position of the constriction member. The invention, however, also comprises devices in which said functions are performed by separate means. For instance, the switch 35 may be adapted to be operated by a separate pressure differential sensitive means instead of by the plunger 28. Another embodiment schematically represented in FIG. 3 comprises a throttle valve 55, a pressure sensitive device 56 the piston 57 of which is connected to the valve body 58 of the throttle valve, and a second pressure sensitive device 59 the piston 60 of which actuates a switch 61 corresponding to the switch 20 of FIG. 1. When there is no pressure differential acting on the device 56, a spring 62 maintains the valve body 58 in the position of maximum flow resistance. Both of the devices 56, 59 are connected in parallel with the throttle valve 55, so that they are actuated by the pressure differential caused by a flow of fluid through the throttle valve 55. The inlet 63 of the device is connected to the supply of compressed air, while the outlet 64 is connected to the flexible conduit through which the compressed air is conveyed to the welding gun. The opening of the motor valve subjects the pressure sensitive devices 56 and 59 to a pressure differential causing the piston 60 to operate the switch 61 and causing the piston 57 to move the throttle valve body 58 to a position of less resistance. In a modification of the embodiment just described, the pressure sensitive means 59 is dispensed with by adapting the piston 57 to operate the switch 61 as well as the throttle valve.

I claim:

1. Apparatus for gas-shielded metal arc welding comprising a welding gun, a pressure fluid driven wire advancing motor in said gun, a pressure fluid source, a first conduit from said source to said motor, valve means in said gun for controlling the supply of pressure fluid to said motor, a manually operable actuating member connected to said valve means, a flexible welding cable connected to said gun, a second flexible conduit for the supply of shielding gas connected to said gun, a control unit connected to said first conduit, a shielding gas valve connected between said flexible shielding gas conduit and a supply of shielding gas and operatively connected to said control unit, flow obstructing means in said first conduit comprising a flow obstructing member movable between a position of maximum flow resistance and a position of minimum flow resistance, spring means urging said member towards the position of maximum flow resistance, first and second pressure sensitive means connected to said first conduit so as to be actuated by the pressure differential caused by a flow of fluid through said flow obstructing means, said first pressure sensitive means being operatively connected with said flow obstructing member to move it towards the position of minimum flow resistance, and said control unit being operated by said second pressure sensitive means for opening said shielding gas valve prior to said flow obstructing means reaching its position of minimum flow resistance.

2. Apparatus as claimed in claim 1 in which said control unit includes a welding current contactor controlled by the means operated by said second pressure sensitive means.

3. Apparatus for gas-shielded metal arc welding comprising a welding gun, a pressure fluid driven wire advancing motor in said gun, a pressure fluid source, a first conduit from said source to said motor, valve means in said gun for controlling the supply of pressure fluid to said motor, a manually operable actuating member connected to said valve means, a flexible welding cable connected to said gun, a second flexible conduit for the supply of shielding gas connected to said gun, a control unit connected to said first conduit, a shielding gas valve connected between said flexible shielding gas conduit and supply of shielding gas and operatively connected to said control unit, a throttle valve in said first conduit, said throttle valve comprising a valve housing, a valve body guided in said housing for sliding movement between a position of maximum flow resistance and a position of minimum flow resistance, the direction of the movement from the position of maximum flow resistance to the position of minimum flow resistance being the same as the direction of the axial flow through the valve, and spring means urging said valve body towards the position of maximum flow resistance, whereby the pressure differential caused by a flow of fluid through said valve will urge the valve member towards the position of minimum flow resistance against the action of the spring means, pressure sensitive means connected to said first conduit so as to be actuated by the pressure differential caused by a flow of fluid through said throttle valve, and said control unit being operated by said pressure sensitive means for opening said shielding gas valve prior to said throttle valve reaching its position of maximum flow resistance.

4. Apparatus for gas-shielded metal arc welding comprising a welding gun, a pressure fluid driven wire advancing motor in said gun, a pressure fluid source, a first conduit from said source to said motor, valve means in said gun for controlling the supply of pressure fluid to said motor, a manually operable actuating member connected to said valve means, a flexible welding cable connected to said gun, a second flexible conduit for the supply of shielding gas connected to said gun, a control unit connected to said first conduit, a shielding gas valve connected between said flexible shielding gas conduit and a supply of shielding gas and operatively connected to said control unit, a throttle valve in said first conduit, said throttle valve comprising a valve housing, a valve body guided in said housing for sliding movement between a position of maximum flow resistance and a position of minimum flow resistance, the direction of the movement from the position of maximum flow resistance to the position of minimum flow resistance being the same as the direction of the axial flow through the valve, and spring means urging said valve body towards the position of maximum flow resistance, whereby the pressure differential caused by a flow of fluid through said valve will urge the valve body towards the position of minimum flow resistance against the action of the spring means, and said control unit being operated by said valve body for opening said shielding gas valve prior to said throttle valve reachine its position of maximum flow resistance.

5. Apparatus as claimed in claim 4 in which said control unit includes a welding current contactor controlled by the means operated by the valve body.

6. Apparatus as described in claim 1, said flow obstructing means comprising a body block, a bore in said body block, said bore having an annular groove, connecting members at each end of said bore for connecting the bore to the conduit, a plunger slidably engaging said bore, a bore in said plunger, said last-mentioned bore extending from the downstream extremity of the plunger to a point slightly behind the upstream extremity of the plunger, at least one radial port extending from the inner end of said last-mentioned bore to the annular groove of the bore of the body block, a compression spring urging the plunger towards a position of rest in which the upstream extremity of the plunger engages the bore of the body block upstreams of the annular groove, a chamber provided in said body block laterally of the bore, a passage connecting said chamber with the upstream extremity of the bore of the body block, means for sealing off said chamber from the atmosphere, a switch in said chamber, and a switch actuating member extending into the bore of the body block through said passage so as to engage the upstream end of the plunger in the aforesaid position of rest of the plunger.

References Cited

UNITED STATES PATENTS 2,423,190   7/1947   Kennedy.
3,319,042   5/1967   Thostrup et al.

JOSEPH V. TRUHE, Primary Examiner

J. G. SMITH, Assistant Examiner

U.S. Cl. X.R.

219—74